Dec. 24, 1957 I. M. HOROWITZ 2,817,717

MAGNETIC AMPLIFIERS

Filed July 29, 1954

INVENTOR
Isaac M. Horowitz

BY Ralph B. Stewart

ATTORNEY

United States Patent Office 2,817,717

Patented Dec. 24, 1957

2,817,717

MAGNETIC AMPLIFIERS

Isaac M. Horowitz, Brooklyn, N. Y., assignor to Polytechnic Institute of Brooklyn, Brooklyn, N. Y., a corporation of New York Application July 29, 1954, Serial No. 446,499

3 Claims. (Cl. 179—171)

This invention relates to magnetic amplifiers, and especially to amplifiers of the push-pull type.

In magnetic amplifiers of the push-pull type, where alternating current of either phase polarity is supplied to a single load through two alternating current supply circuits connected in push-pull relation to the load, the capacity of the amplifier is considerably limited by the circulating currents flowing between the supply circuits without passing through the load.

The circulating or excess currents in a push-pull amplifier constitute a serious problem in high-gain amplifiers. Attempts have been made to solve this problem by the use of mixing resistors for supplying current from the two supply circuits to the common load while limiting the circulating or excess currents flowing between the two supply circuits. Such arrangements are objectionable because the mixing resistors necessarily limit the value of the useful output current and involve considerable energy loss.

An object of my invention is to devise a push-pull amplifier in which the circulating or excess currents are reduced without the use of mixing resistors.

Another object of my invention is to devise a push-pull amplifier circuit which is useful both as a voltage amplifier and a current amplifier.

My invention involves the use of two reactors each having a reactance winding connected in series relation with a rectifier in each supply circuit, and each rectifier energizes a feed-back circuit which includes a magnetizing winding on each of the four reactors. This arrangement possesses a number of advantages over the conventional voltage doubler push-pull magnetic amplifier. The principal advantage is that of low circulating or excess currents which have a maximum rectified average value of only one-half the maximum load current. My amplifier provides a greater gain than the voltage doubler amplifier. In addition, it is less sensitive to variations in bias voltage and line supply voltage, it is easier to adjust with respect to bias, and is more stable in the saturated range of operation. These advantages are obtained with slight increase in complexity of the amplifier circuit.

Figure 1:
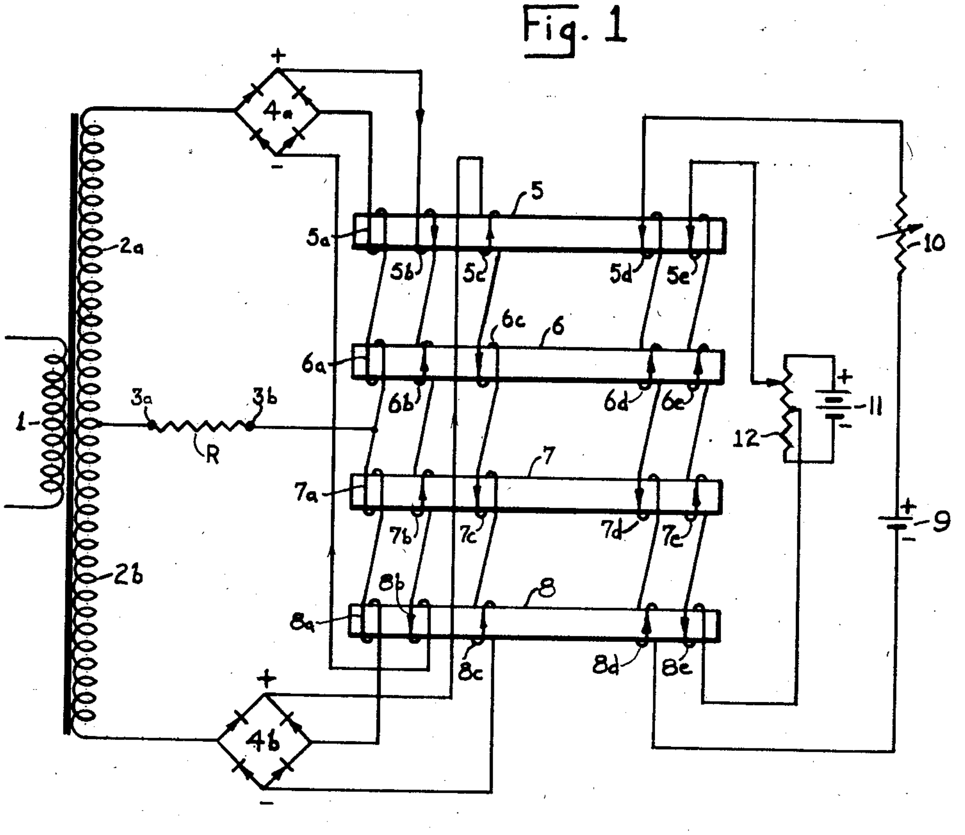
Figure 2:
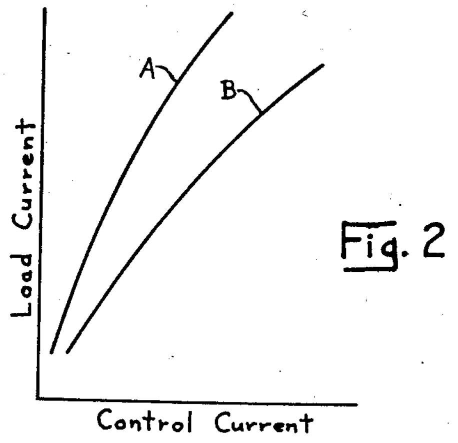

One form of my invention is illustrated in the accompanying drawing in which Figure 1 is a circuit diagram of my improved push-pull amplifier and Figure 2 is a diagram of comperative curves illustrating the operation of my amplifier and the conventional voltage doubler amplifier.

Referring to Figure 1 of the drawing, alternating current for operation of the amplifier is supplied from a suitable circuit through a transformer having a primary winding 1 and a secondary winding formed of two sections *2a* and *2b*. A suitable load shown as R is connected across the two output terminals *3a* and *3b*, the terminal *3a* being connected to the midpoint of the transformer secondary winding. One alternating current supply circuit for load R is completed from the free end of winding section *2a* to the terminal *3b* through a rectifier bridge *4a*, and through reactance windings *5a* and *6a* of the saturable reactors 5 and 6. Another alternating current supply circuit for load R is completed from the free end of winding section *2b* through a rectifier bridge

*4b*, and through reactance windings *7a* and *8a* on saturable reactors 7 and 8 respectively. It will be noted that the two supply circuits are connected to the load R in push-pull relation, that is, the voltages impressed across the load terminals *3b* and *3c* by the two supply circuits are of opposite phase relation.

Two feed-back circuits are energized by rectified current from rectifier bridges *4a* and *4b* respectively. The circuit from rectifier *4a* includes in series circuit relation feed-back windings *5b*, *6b*, *7b* and *8b* on saturable reactors 5 to 8 respectively, and the feed-back circuit from rectifier bridge *4b* includes in series circuit relation feed-back coils *5c*, *6c*, *7c* and *8c* on saturable reactors 5 to 8 respectively. As shown in the drawing, the two feed-back windings on each saturable reactor core are poled to produce magnetizing forces in the reactor core in opposite directions. The reactance winding *5a* in one supply circuit is poled in the same manner as the feed-back winding *5b* supplied from the same supply circuit through rectifier *4a*, and the second reactance winding *6a* in this supply circuit is poled oppositely with respect to the feed-back winding *6b* in the same feed-back circuit. In other words, for a given direction of current flow in the upper supply circuit containing windings *5a* and *6a*, winding *5a* produces a magnetizing force in the reactor core in the same direction as winding *5b*, while winding *6a* produces a magnetizing force in the opposite direction to that produced by winding *6b*. In a like manner, reactance winding *7a* in the other supply circuit is poled in the same manner as the feed-back winding *7c* supplied from the same supply circuit through rectifier bridge *4b*, and the other reactance winding *8a* is poled oppositely with respect to feed-back winding *8c* connected in the same feed-back circuit with the winding *7c*.

Suitable means is provided for normally biasing the cores of the saturable reactors, such as a magnetizing circuit supplied with direct current from a source 9 through an adjustable resistor 10, and through magnetizing windings *5d*, *6d*, *7d* and *8d* in series circuit relation. An input or control circuit is provided to vary the magnetization of the cores of the four reactors. One suitable arrangement is shown in Figure 1 in which a voltage of either polarity and adjustable in magnitude is derived from a suitable source 11 through a center tap potentiometer 12 and supplied through magnetizing winding *5e*, *6e*, *7e* and *8e* connected in series relation. The two magnetizing windings on each reactor associated with the upper supply circuit are poled in like relation, while the two magnetizing windings for each reactor associated with the lower supply circuit are poled in opposite directions. It will be obvious that the bias and control currents may be superimposed upon each other in a single set of magnetizing windings instead of in two sets of windings as shown.

The circuit constants are designed so that the two reactors in either supply circuit do not saturate simultaneously. In the simplest form of the amplifier, the two supply circuits will be of identical composition and the four reactors will be of identical construction, but in any case the two feed-back windings on any reactor will be of equal turns. For optimum operation, the circuit constants should be selected so that the maximum rectified average value of the circulating current is one-half the maximum rectified average output current, and the following relations are also satisfied:

$$\frac{V_m}{\omega N}d=2\phi_s;\text{ and } I_x=I_m$$

where $V_m$=peak value of applied voltage in the supply circuit $d=1+R/R_t$; ($R$=load resistance and $R_t=R+$other resistance in the supply circuit)

$\omega$=angular frequency of the applied voltage
$N$=number of turns in reactance coils in the supply circuit
$N_b$=number of turns in biasing coils
$\phi_s$=saturation flux of reactors (dependent upon core material)
$I_x=2I_b(N_b/N)$ where $I_b$ is the biasing current
$I_m$=maximum rectified average load current $$\left(\frac{2}{\pi}\cdot\frac{V_m}{R_t}\right)$$

With the above relation established, the circulating currents at zero control signal input will be one-half the maximum rectified average load current. The circulating current will be zero when the applied input signal produces maximum output current which will be twice the value of the circulating current at zero input signal.

The gain characteristic of my amplifier is shown in curve A of Figure 2 which shows how the load current varies with changes in value of control current. Curve B of Figure 2 shows the gain characteristic of a voltage-doubler magnetic amplifier of equivalent circuit constants, of the type illustrated on page 200 of the book "Magnetic-Amplifier Circuits" by W. A. Geyger, published by McGraw-Hill Book Company, 1954. The curves of Figure 2 show that my circuit provides higher values of gain than the voltage-doubler circuit over the same range of control current values.

My amplifier circuit is less sensitive than the voltage-doubler circuit to changes in biasing current. In the voltage-doubler circuit, a given percentage change in biasing current will produce a relatively large change in circulating current equal to the percentage change in biasing current times the gain of the amplifier. On the other hand, in my amplifier, where the biasing current is derived from a source independent of the line voltage supplying the load circuit, a given percentage change in biasing current will result in the same percentage change in the circulating current. Also, in my circuit, when the biasing current is derived from the same source as the load current, the circulating current will be unaffected by changes in the biasing current when the control current is at zero.

Also, my circuit is less critical to adjustment of the bias. In the voltage-doubler circuit, if the bias is too large it will result in non-linear operation and if it is too small the circulating current will be quite large. On the other hand, small deviation in adjustment of the bias in my circuit does not cause any objectional changes in operation. The correct value of the biasing current $I_b$ is determined quite easily from the relations given above for $I_x$ and $I_m$.

I claim:

1. A magnetic amplifier comprising a pair of load terminals, two alternating current supply circuits connected to said load terminals in push-pull relation, four saturable reactors each having a reactance winding and a saturable magnetic core, the reactance windings of two of said reactors being connected in series in one of said supply circuits and the reactance windings of the other two reactors being connected in series in the other supply circuit, a pair of full-wave rectifiers connected in series with said supply circuits respectively, and being energized by the alternating currents flowing in the respective supply circuits, means for magnetically biasing the cores of said reactors, a control circuit including a control winding on each core for variably magnetizing the cores of said reactors, the control windings on the two reactors of one supply circuit being poled to act in opposition to said biasing means, and the control windings on the reactors for the other supply circuit being poled to augment the action of said biasing means in the cores of the reactors of the said other supply circuit, two feed-back circuits connected to be energized by rectified current from said rectifiers respectively and each including a feed-back winding on each of said reactors, the two feed-back windings on each reactor core and energized from separate rectifiers being poled in opposite directions, the two reactance windings connected in each supply circuit being so poled that one produces a magnetizing force in the reactor core in the same direction as that produced by the feed-back winding energized from the rectifier of the corresponding supply circuit and the other produces a magnetizing force in its reactor core in a direction opposite to that produced by the feed-back winding supplied from the same rectifier.

2. A magnetic amplifier comprising a pair of load terminals, two alternating current supply circuits connected to said load terminals in push-pull relation, four saturable reactors each having a reactance winding and a saturable magnetic core, the reactance windings of two of said reactors being connected in series in one of said supply circuits and the reactance windings of the other two reactors being connected in series in the other supply circuit, a pair of full-wave rectifiers connected in series with said supply circuits respectively, and being energized by the alternating currents flowing in the respective supply circuits, a biasing circuit for said reactors including a magnetizing winding on the core of each of said reactors, a control circuit for said reactors including a magnetizing winding on the core of each reactor, the two magnetizing windings on the core of each of the two reactors having reactance windings connected in one supply circuit being poled alike and the two magnetizing windings on the core of each of the two reactors having reactance windings connected in the other supply circuit being oppositely poled, two feed-back circuits connected to be energized by rectified current from said rectifiers respectively and each including a feed-back winding on the core of each of said reactors, the two feed-back windings on each reactor being poled in opposite directions, the two reactance windings on the two reactors connected in each supply circuit being so poled that one produces a magnetizing force in the reactor core in the same direction as that produced by the feed-back winding energized from the rectifier of the corresponding supply circuit and the other produces a magnetizing force in its reactor core in a direction opposite to that produced by the feed-back winding supplied from the same rectifier.

3. In a push-pull magnetic amplifier, the combination of a pair of load terminals, two alternating current supply circuits connected to said load terminals in push-pull relation, four saturable reactors each having a reactance winding and a saturable magnetic core, the reactance windings of two of said reactors being connected in series in one of said supply circuits and the reactance windings of the other two reactors being connected in series in the other supply circuit, a pair of full-wave rectifiers connected in series with said supply circuits respectively, and being energized by the alternating currents flowing in the respective supply circuits, two feed-back circuits connected to be energized by rectified current from said rectifiers respectively and each including a feed-back winding on each of said reactors, the two feed-back windings on each reactor core being poled in opposite directions, the two reactance windings connected in each supply circuit being so poled that one produces a magnetizing force in the reactor core in the same direction as that produced by the feed-back winding energized from the rectifier of the corresponding supply circuit and the other produces a magnetizing force in its reactor core in a direction opposite to that produced by the feed-back winding supplied from the same rectifier.

References Cited in the file of this patent

UNITED STATES PATENTS 2,700,130 Geyger ---------------- Jan. 18, 1955